(12) United States Patent
McKenney et al.

(10) Patent No.: US 11,386,079 B2
(45) Date of Patent: Jul. 12, 2022

(54) REPLACING PREEMPTIBLE RCU WITH AN AUGMENTED SRCU IMPLEMENTATION

(71) Applicant: International Business Machines Corporation, Armonk, NY (US)

(72) Inventors: Paul E. McKenney, Beaverton, OR (US); Lawrence Roy, Corvallis, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 16/453,519

(22) Filed: Jun. 26, 2019

(65) Prior Publication Data

US 2020/0409938 A1    Dec. 31, 2020

(51) Int. Cl.
*G06F 16/23* (2019.01)
*G06F 9/52* (2006.01)
*G06F 16/22* (2019.01)

(52) U.S. Cl.
CPC .......... *G06F 16/2379* (2019.01); *G06F 9/526* (2013.01); *G06F 16/2246* (2019.01)

(58) Field of Classification Search
CPC ... G06F 16/2379; G06F 16/2246; G06F 9/526
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 4/1997 | Slingwine et al. | |
| 5,727,209 A | 3/1998 | Slingwine et al. | |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,191,272 B2 | 3/2007 | McKenney | |
| 7,287,135 B2 | 10/2007 | McKenney et al. | |
| 7,353,346 B2 | 4/2008 | McKenney et al. | |
| 7,349,879 B2 | 6/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |

(Continued)

OTHER PUBLICATIONS

McKenney, Paul. "Hierarchical RCU [LWN.net]." Lwn.net, Nov. 4, 2008, lwn.net/Articles/305782/. Accessed Mar. 1, 2022. (Year: 2008).*

(Continued)

*Primary Examiner* — William B Partridge
*Assistant Examiner* — Erich Alexander Fischer
(74) *Attorney, Agent, or Firm* — Edward Wixted, Esq.; Kevin P. Radigan, Esq.; Heslin Rothenberg Farley & Mesiti P.C.

(57) ABSTRACT

An augmented sleepable read-copy update implementation (PREEMPT_SRCU) combines elements of a tree-based sleepable read-copy update environment (Tree-SRCU) with elements of a preemptible read-copy update environment (Preemptible-RCU). The elements of Tree-SRCU may be used to manage PREEMPT_SRCU grace periods and handle PREEMPT_SRCU callbacks. The elements of Preemptible-RCU may be used to drive existing PREEMPT_SRCU grace periods to completion.

12 Claims, 9 Drawing Sheets

(56) References Cited

U.S. PATENT DOCUMENTS

| | | |
|---|---|---|
| 7,472,228 B2 | 12/2008 | McKenney et al. |
| 7,653,791 B2 | 1/2010 | McKenney |
| 7,689,789 B2 | 3/2010 | McKenney et al. |
| 7,734,879 B2 | 6/2010 | McKenney et al. |
| 7,734,881 B2 | 6/2010 | McKenney et al. |
| 7,747,805 B2 | 6/2010 | McKenney |
| 7,814,082 B2 | 10/2010 | McKenney |
| 7,818,306 B2 | 10/2010 | McKenney et al. |
| 7,904,436 B2 | 3/2011 | McKenney |
| 7,953,708 B2 | 5/2011 | McKenney et al. |
| 7,953,778 B2 | 5/2011 | McKenney et al. |
| 8,020,160 B2 | 9/2011 | McKenney |
| 8,055,860 B2 | 11/2011 | McKenney et al. |
| 8,055,918 B2 | 11/2011 | McKenney et al. |
| 8,108,696 B2 | 1/2012 | Triplett |
| 8,126,843 B2 | 2/2012 | McKenney et al. |
| 8,176,489 B2 | 5/2012 | Bauer et al. |
| 8,185,704 B2 | 5/2012 | McKenney et al. |
| 8,195,893 B2 | 6/2012 | Triplett |
| 8,407,503 B2 | 3/2013 | McKenney |
| 8,495,641 B2 | 7/2013 | McKenney |
| 8,615,771 B2 | 12/2013 | McKenney |
| 8,706,706 B2 | 4/2014 | McKenney |
| 8,869,166 B2 | 10/2014 | McKenney |
| 8,874,535 B2 | 10/2014 | McKenney |
| 8,924,655 B2 | 12/2014 | McKenney |
| 8,938,631 B2 | 1/2015 | McKenney |
| 8,972,801 B2 | 3/2015 | McKenney |
| 9,003,420 B2 | 4/2015 | McKenney |
| 9,189,413 B2 | 11/2015 | McKenney |
| 9,250,978 B2 | 2/2016 | McKenney |
| 9,256,476 B2 | 2/2016 | McKenney |
| 9,348,765 B2 | 5/2016 | McKenney |
| 9,396,226 B2 | 6/2016 | McKenney |
| 9,389,925 B2 | 7/2016 | McKenney |
| 9,519,307 B2 | 12/2016 | McKenney |
| 9,552,236 B2 | 1/2017 | McKenney |
| 9,720,836 B2 | 8/2017 | McKenney |
| 9,886,329 B2 | 2/2018 | McKenney |
| 10,146,577 B2 | 4/2018 | McKenney |
| 9,965,432 B2 | 5/2018 | McKenney |
| 10,140,131 B2 | 11/2018 | McKenney |
| 10,268,610 B1 | 4/2019 | McKenney |
| 10,282,230 B2 | 5/2019 | McKenney |
| 2008/0082532 A1 | 4/2008 | McKenney |
| 2013/0061071 A1 | 3/2013 | McKenney |
| 2016/0335183 A1* | 11/2016 | McKenney ......... G06F 12/0811 |
| 2018/0060086 A1 | 3/2018 | McKenney |
| 2018/0267840 A1 | 9/2018 | McKenney |
| 2019/0034231 A1 | 1/2019 | McKenney |
| 2019/0147077 A1* | 5/2019 | McKenney ......... G06F 16/2365 707/615 |

OTHER PUBLICATIONS

McKenney, Paul. "Sleepable RCU [LWN.net]." Lwn.net, Oct. 9, 2006, lwn.net/Articles/202847/. Accessed Mar. 1, 2022. (Year: 2006).*
P. McKenney et al., "Read-Copy Update: Using Execution History to Solve Concurrency Problems," PDCS, Oct. 1998, 11 pages.
P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[Patch] slab: document SLAB_DESTROY_BY_RCU", LKML.org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN. net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN. net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions On Parallel And Distributed Systems, vol. x, No. y, Jul. 2009, pp. 1-14.
P. McKenney, "Making RCU Safe For Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out Of The Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.

(56) References Cited

OTHER PUBLICATIONS

P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
P. McKenney, "What Happens When 4096 Cores All Do synchronize_rcu_expedited()?", linux.conf.au, Geelong, Australia, Feb. 3, 2015.
L. Lian et al., "Verification of The Tree-Based Hierarchical Read-Copy Update the Linux Kernel", Cornell University Library, pp. 1-14, Oct. 11, 2016.
P. McKenney, "A Tour Through RCU's Requirements", LWN.net; 2015, 36 pages.
I. Molnar et al., "/ kernel / rcu / tree.h /" Elixar Cross Referencer, Linux v. 4.12, Jul. 2017, 11 pages.
P. McKenney, "[PATCH tip/core/rcu 40/40] srcu: Parallelize callback handling", Apr. 12, 2017, 21 pages.
P. McKenney, "/ include / linux / srcutree.h" Elixar Cross Referencer, Linux v. 4.12, Jul. 2017, 3 pages.

\* cited by examiner

REPLACING PREEMPTIBLE RCU WITH AN AUGMENTED SRCU IMPLEMENTATION

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution have been treated as implicit quiescent states. In modern kernel-based RCU implementations, a quiescent state is typically delineated by a kernel code path being outside an RCU read-side critical section. RCU read-side primitives such as rcu_read_lock( ) and rcu_read_unlock( ) are commonly used by the readers to denote the beginning and end of such critical sections.

In some RCU implementations, such as existing versions of the Linux® kernel, there is an RCU flavor denominated Preemptible-RCU and an RCU flavor denominated Sleepable-RCU or SRCU.

Preemptible-RCU allows a task executing within an RCU read-side critical section (RCU reader) to be preempted or block while guaranteeing that any corresponding RCU grace period needed to protect the RCU reader will not end until the task has resumed execution and exited its RCU read-side critical section. Preemptible-RCU uses a combining tree of rcu_node structures to track processor (e.g., CPU) quiescent states. The rcu_node structures at the leaf level of the rcu_node tree additionally track RCU readers that were preempted within their RCU read-side critical sections during the current RCU grace period. The leaf rcu_node structures are also used to drive existing RCU grace periods to completion by handling blocked readers and responding to delayed Preemptible-RCU grace periods, such as by implementing priority boosting, issuing RCU CPU stall warnings, and providing forward-progress assistance for preempted RCU readers that require it.

SRCU allows readers to block or sleep during their RCU read-side critical sections. SRCU may thus be used from the idle loop and from offline CPUs. This is not allowed in classic RCU implementations because arbitrary sleeping within RCU read-side critical sections could indefinitely extend grace periods. The strategy employed by SRCU is to isolate RCU grace-period detection within separate subsystems of the operating system kernel so that memory reclamation by SRCU updaters in one subsystem is not blocked by SRCU readers in other subsystems, and visa versa. Each subsystem may have a bounded number of available memory blocks that is less than the total number of memory blocks available system-wide. Example operating system subsystems for which SRCU may be used include virtualization, memory management, file systems, block I/O, drivers, etc. Recent versions of the Linux® kernel have adopted a hierarchical version of SRCU known as Tree-SRCU. Tree-SRCU uses a combining tree of srcu_node structures to advance SRCU grace periods.

Both Preemptible-RCU and Tree-SRCU are useful, but in some cases it would be desirable to have only one RCU implementation, so that Tree-SRCU could provide most of the services currently provided by Preemptible-RCU, but also provide the attractive properties of SRCU. Unfortunately, the current state of the art provides Tree-SRCU with certain shortcomings on one hand (inexact or even no priority boosting, inexact or even no RCU CPU stall warnings, and inexact or even no forward-progress assistance) and on the other hand provides Preemptible-RCU with its own set of shortcomings (not being usable from the idle loop, not being usable from offline CPUs).

It is submitted that combining the strengths of Preemptible-RCU and Tree-SRCU, while also reducing code size, could be attractive in various scenarios. One such scenario envisioned by applicant is small-footprint operating systems running on multicore devices, such as those proposed for some Internet of Things (IoT) devices.

SUMMARY

A method, system and computer program product provide an augmented sleepable read-copy update implementation (PREEMPT_SRCU) that combines elements of a tree-based sleepable read-copy update environment (Tree-SRCU) with elements of a preemptible read-copy update environment (Preemptible-RCU). The elements of Tree-SRCU may be used to manage PREEMPT_SRCU grace periods and handle PREEMPT_SRCU callbacks. The elements of Preemptible-RCU may be used to drive existing PREEMPT_SRCU grace periods to completion.

BRIEF DESCRIPTION OF THE DRAWINGS

The foregoing and other features and advantages will be apparent from the following more particular description of example embodiments, as illustrated in the accompanying Drawings.

DETAILED DESCRIPTION

Figure 1:
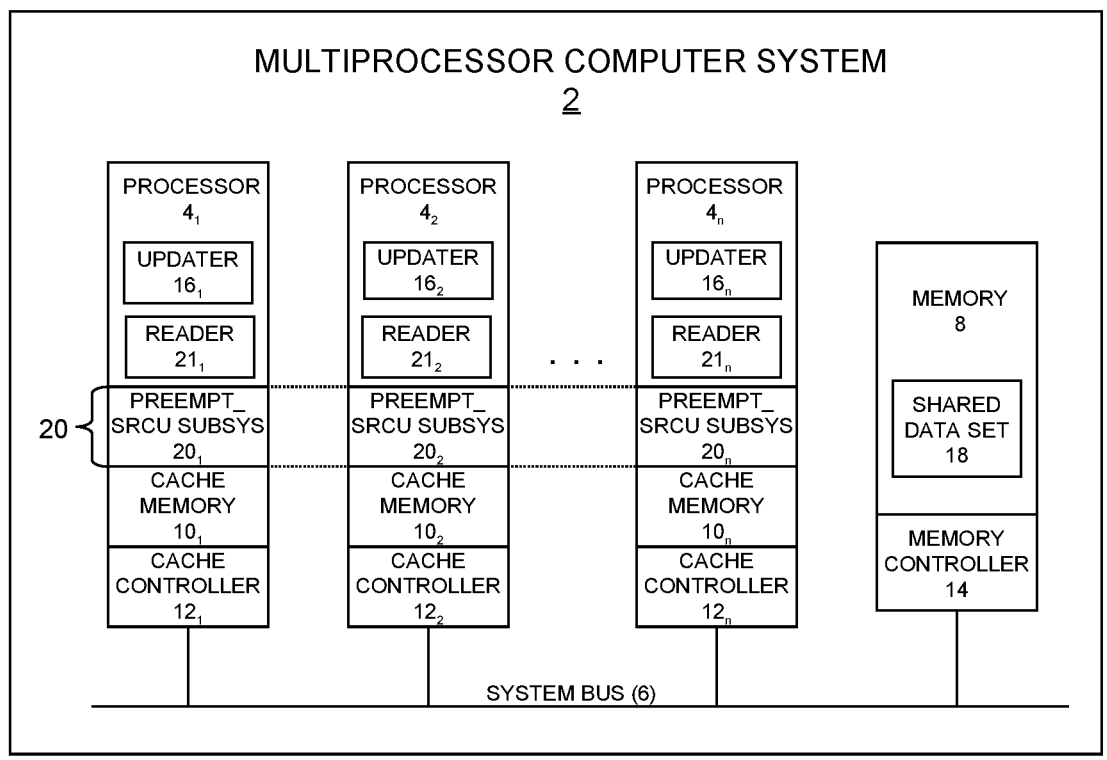
FIG. 1 is a functional block diagram showing a multiprocessor computer system that may be constructed in accordance with the present disclosure.

Turning now to the figures, wherein like reference numerals represent like elements in all of the several views, FIG. 1 illustrates an example multiprocessor computer system 2 in which a technique for replacing Preemptible-RCU with an augmented Tree-SRCU implementation (referred to herein as PREEMPT_SRCU) may be practiced. The computer system 2 may include a plurality of processors $4_1, 4_2 \ldots 4_n$, a system bus 6, and a main program memory 8. There may also be cache memories $10_1, 10_2 \ldots 10_n$ and cache controllers $12_1, 12_2 \ldots 12_n$ respectively associated with the processors $4_1, 4_2 \ldots 4_n$. The cache memories 10 may be implemented in several levels (e.g., as level 1, level 2 and level 3 caches) and the cache controllers 12 may collectively represent the cache controller logic that supports each cache level. A memory controller 14 may be associated with the main memory 8. The memory controller 14 may be integrated with the processors 4 or could reside separately therefrom, for example, as part of a discrete chipset.

The computer system 2 may represent any of several different types of computing apparatus. Such computing apparatus may include, but are not limited to, general purpose computers, special purpose computers, portable computing devices, portable computing-communication devices (such as smartphones), media player devices, set-top devices, embedded systems, Internet of Things (IoT) devices, and many other types of information handling machines. The term "processor" as used with reference to the processors 4 encompasses any type of instruction execution device capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors 4 may be situated within a single computing device or node (e.g., as part of a single-node SMP system) or they may be distributed over plural nodes (e.g., as part of a NUMA system, a cluster, or a cloud). The main memory 8 may be implemented using any suitable type of tangible storage medium capable of storing data in computer readable form for use in program execution, including but not limited to, any of various types of random access memory (RAM) (such as DRAM), various flavors of programmable read-only memory (PROM) (such as flash memory), and other types of primary storage (i.e., program memory). The cache memories 10 may likewise be implemented using any suitable type of primary storage, including but not limited to SRAM.

Each processor 4 is operable to execute program instruction logic under the control of program instructions stored in the main memory 8 (or elsewhere). As part of this program execution logic, PREEMPT_SRCU update operations (updaters) 16 may execute within a process, thread, or other execution context (hereinafter "task") on any of the processors 4. Each PREEMPT_SRCU updater 16 may run periodically to perform updates on a set of shared data 18 that may also be stored in the main memory 8 (or elsewhere). In FIG. 1, reference numerals $16_1, 16_2 \ldots 16_n$ illustrate individual PREEMPT_SRCU updaters that respectively execute on the several processors $4_1, 4_2 \ldots 4_n$. The updates performed by an PREEMPT_SRCU updater 16 can include modifying elements of a linked list, inserting new elements into the list, deleting elements from the list, and other types of operations. In an embodiment, the PREEMPT_SRCU updaters 16 may invoke conventional Tree-SRCU update operations found in existing Tree-SRCU implementations.

The processors 4 may be programmed from instructions stored in the main memory 8 (or elsewhere) to implement a PREEMPT_SRCU subsystem 20, as part of their data processing functions. In accordance with the present disclosure, the PREEMPT_SRCU subsystem 20 represents an augmented Tree-SRCU implementation may be used to replace Preemptible-RCU. More particularly, instead of the computer system 2 separately providing both Preemptible-RCU and Tree-SRCU subsystems, with all of the many data structures and program operations required by those implementations, the computer system instead reduces memory requirements by implementing a single PREEMPT_SRCU subsystem 20 that combines elements of Tree-SRCU with elements of Preemptible-RCU. In FIG. 1, reference numbers $20_1, 20_2 \ldots 20_n$ represent individual PREEMPT_SRCU subsystem instances that may respectively periodically execute on the several processors $4_1, 4_2 \ldots 4_n$. Operational details of the PREEMPT_SRCU subsystem 20 are described below.

Any given processor 4 may also periodically execute PREEMPT_SRCU read operations (readers) 21. In an embodiment, the PREEMPT_SRCU readers 21 invoke augmented SRCU read operations that may be used in lieu of Preemptible-RCU read operations. The readers 21 that invoke these augmented SRCU read operations are referred herein as PREEMPT_SRCU readers. Each PREEMPT_SRCU reader 21 may run from program instructions stored in the main memory 8 (or elsewhere) in order to periodically perform PREEMPT_SRCU read operations on the set of shared data 18 stored in the main memory (or elsewhere). In FIG. 1, reference numerals $21_1, 21_2 \ldots 21_n$ illustrate individual PREEMPT_SRCU reader instances that may respectively execute on the several processors $4_1, 4_2 \ldots 4_n$. The PREEMPT_SRCU read operations will typically be performed far more often than PREEMPT_SRCU update operations, this being one of the premises underlying the use of read-copy update. Moreover, it is possible for several of the PREEMPT_SRCU readers 21 to maintain simultaneous references to one of the shared data elements 18 while a PREEMPT_SRCU updater 16 updates the same data element.

During operation of the computer system 2, a PREEMPT_SRCU updater 16 may occasionally perform an update to one of the shared data elements 18. In accordance with the philosophy of RCU, a first-phase update may be performed in a manner that temporarily preserves a pre-update view of the shared data element for the benefit of PREEMPT_SRCU readers 21 that may be concurrently referencing the shared data element during the update operation. Following the first-phase update, the PREEMPT_SRCU updater 16 may invoke the PREEMPT_SRCU subsystem 20 to track a PREEMPT_SRCU grace period for deferred destruction of the pre-update view of the data (second-phase update).

Figure 2:
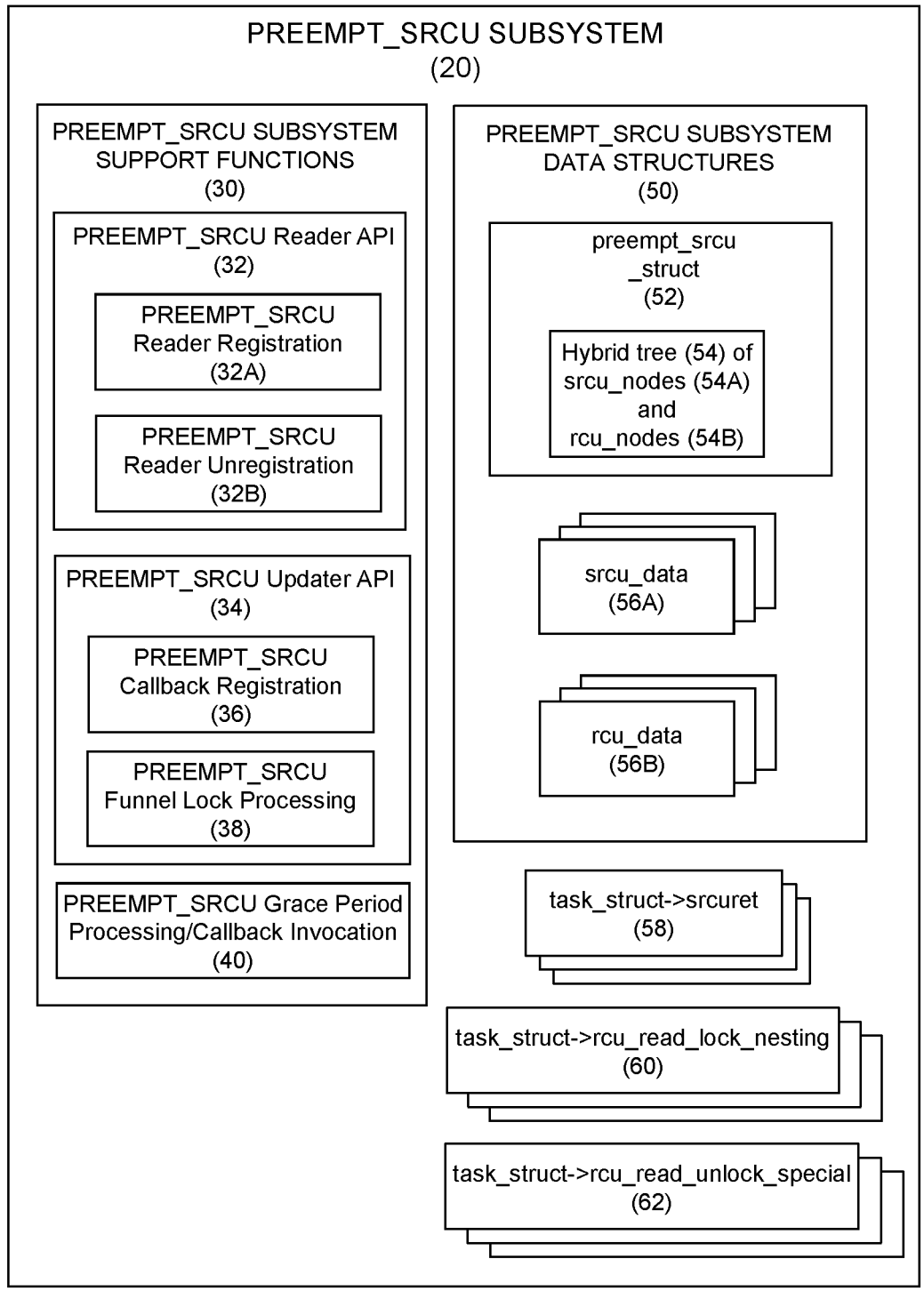
FIG. 2 is a functional block diagram showing an example PREEMPT_SRCU subsystem that may be provided in the computer system of FIG. 1.

Turning now to FIG. 2, example components of the PREEMPT_SRCU subsystem 20 are shown. Among these components is a set of PREEMPT_SRCU subsystem support functions 30, namely, a PREEMPT_SRCU Reader API (Application Programming Interface) 32, a PREEMPT_SRCU Updater API 34 that includes a PREEMPT_SRCU callback registration component 36 and a PREEMPT_SRCU funnel lock processing component 38, and PREEMPT_SRCU Grace Period Processing/Callback Invocation functionality 40.

The PREEMPT_SRCU Reader API 32 may include an augmented reader registration component 32A and an augmented reader unregistration component 32B that are respectively invoked by the PREEMPT_SRCU readers 21 as they enter and leave their RCU read-side critical sections to read shared data 16. In an embodiment, the reader registration and unregistration processing may be respectively implemented by combining the rcu_read_lock( ) and rcu_read_unlock( ) primitives found in existing Linux® Preemptible-RCU implementations with the srcu_read_lock( ) and srcu_read_unlock( ) primitives found in existing Linux® Tree-SRCU implementations. These operations are described in more detail below in connection with FIGS. 4 and 5.

As noted above, the PREEMPT_SRCU Updater API 34 may include a PREEMPT_SRCU callback registration component 36 and a PREEMPT_SRCU funnel lock processing component 38. In an embodiment, these components may be implemented using Tree-SRCU functionality found in existing versions of the Linux® kernel.

The PREEMPT_SRCU Grace Period Processing/Callback Invocation functionality 40 includes Tree-SRCU's support for managing PREEMPT_SRCU grace periods (both normal and expedited) and handling PREEMPT_SRCU callbacks. The PREEMPT_SRCU Grace Period Processing/Callback Invocation functionality 40 additionally includes Preemptible-RCU's support for driving existing PREEMPT_SRCU grace periods to completion, such as by tracking blocked PREEMPT_SRCU readers 21, implementing exact priority boosting for such readers, providing exact RCU CPU stall warnings, and delivering exact PREEMPT_SRCU grace period forward progress assistance. Example operations that may be performed while implementing these functions are described in more detail below in connection with FIGS. 6-9.

The PREEMPT_SRCU subsystem 20 may further include a set of PREEMPT_SRCU subsystem data structures 50. These data structures may include a preempt_srcu_struct structure 52, serving as a PREEMPT_SRCU management data structure. In an embodiment, the preempt_srcu_struct structure 52 may have embedded therein (e.g., as a linear array) a hybrid combining tree 54 of both srcu_node structures 54A (as found in Tree-SRCU) and rcu_node structures 54B (as found in Preemptible-RCU). The hybrid combining tree may structured so that there is a set of leaf-level nodes and a set of non-leaf-level nodes. The set of non-leaf-level nodes may include a root level node and zero or more levels of intermediate nodes. In an embodiment, all non-leaf-level nodes of the hybrid combining tree 54 may consist of the srcu_node structures 54A, whereas the leaf-level nodes may consist of both srcu_node structures 54A and rcu_node structures 54B. The preempt_srcu_struct structure 52 and the hybrid combining tree 54 embodied using the srcu_node structures 54A and the rcu_node structures 54B are described in more detail below in connection with FIG. 3.

In an embodiment, each leaf srcu_node structure 54A may be assigned a set of a per-processor srcu_data structures 56A (as found in Tree-SRCU). Each leaf rcu_node structure 54B may be assigned a set of per-processor rcu_data structures 56B (as found in Preemptible-RCU). Each srcu_data structure 56A may represent one processor 4 in the computer system 2, and may be used to maintain PREEMPT_SRCU-related information specific to that processor, including a four-segment PREEMPT_SRCU callback list whose list segments are used to manage PREEMPT_SRCU callbacks waiting for the completion of different PREEMPT_SRCU grace periods. Each rcu_data structure 56B may also represent one processor 4 in the computer system 2. Unlike normal Preemptible-RCU, only a subset of the Preemptible-RCU information maintained by the rcu_data structures 56B is used by the PREEMPT_SRCU subsystem 20, namely, quiescent state tracking and timing information used in combination with the information maintained by the rcu_node structures 54B to drive existing PREEMPT_SRCU grace periods to completion. For example, the Preemptible-RCU information maintained by the rcu_data structures 56B may be used to assist with exact priority boosting for blocked PREEMPT_SRCU readers 21, providing exact RCU CPU stall warnings, and delivering exact PREEMPT_SRCU grace period forward progress assistance.

In an embodiment, the PREEMPT_SRCU subsystem 20 of FIG. 2 may additionally utilize a new per-task PREEMPT_SRCU index field 58 that may be associated with each PREEMPT_SRCU reader 21, such as by adding it to the reader's task structure. In existing Linux® implementations, task structures are implemented as C-language struct task_struct data structures. In an embodiment, the index field 58 may be named t→srcuret. This field stores the SRCU counter index value known as idx in conventional SRCU implementations.

In an embodiment, the PREEMPT_SRCU subsystem 20 of FIG. 2 may additionally utilize a t>rcu_read_lock_nesting counter (60) of the PREEMPT_SRCU reader's task_struct structure, as found in existing Linux® implementations of Preemptible-RCU. The t→read_lock_nesting counter 60 is incremented by Preemptible-RCU's rcu_read_lock( ) primitive when an RCU reader enters its RCU read-side critical section, and is decremented by Preemptible-RCU'srcu_read_unlock( ) primitive when an RCU reader leaves its RCU read-side critical section. If there are nested rcu_read_lock( ) invocations, the count value maintained by the →read_lock_nesting counter 60 reflects a nesting count.

In an embodiment, the PREEMPT_SRCU subsystem 20 of FIG. 2 may additionally utilize an t→rcu_read_unlock_special field 62 of the PREEMPT_SRCU reader's task_struct structure, as found in existing Linux® implementations of Preemptible-RCU. The t→rcu_read_unlock_special field 62 is used to indicate whether special processing is required at the end of a PREEMPT_SRCU read-side critical section, such as when a PREEMPT_SRCU reader 21 blocked or was preempted during that critical section, or the critical section was delayed.

Hybrid Combining Tree

Figure 3:
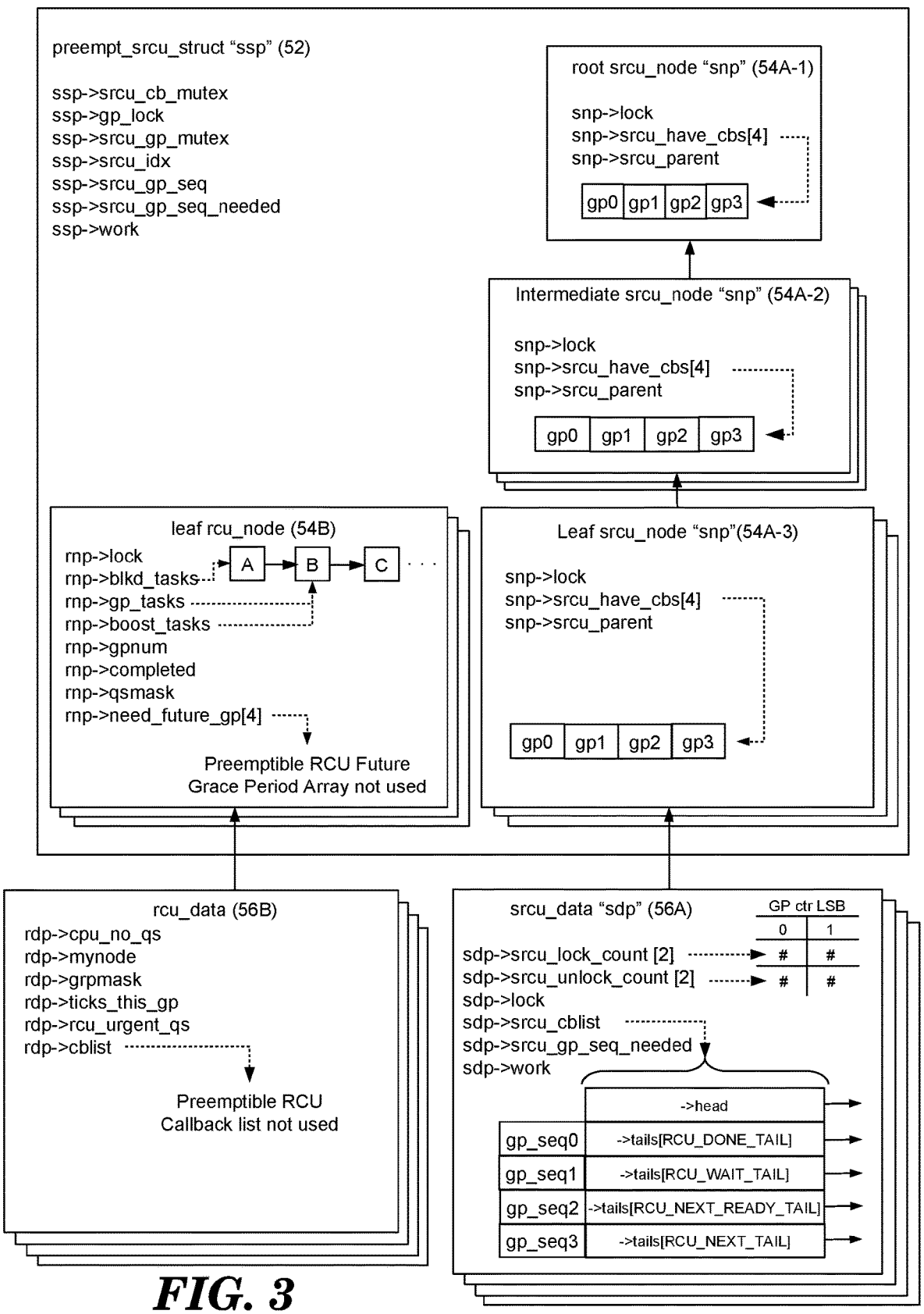
FIG. 3 is a functional block diagram showing example data structures that may be used by the PREEMPT_SRCU subsystem of FIG. 2.

Turning now to FIG. 3, an embodiment of the hybrid combining tree 54 is shown. In this embodiment, the hybrid combining tree 54 has three levels, namely, a root level containing a root srcu_node structure 54A-1, an intermediate-level of zero or more srcu_node structures 54A-2, a set of one or more leaf-level srcu_node structures 54A-3, and a set of one or more leaf-level of rcu_node structures 54B. In an embodiment, the PREEMPT_SRCU subsystem 20 may have the same number of leaf-level srcu_node structures 54A-3 and rcu_node structures 54B. Additional intermediate srcu_node levels may be provided as needed. Alternatively, for smaller systems, there might be zero intermediate levels of srcu_node structures 54A-2, such that the hybrid combining tree 54 consists of only a single root-level srcu_node structure 54A-1, a set of leaf-level srcu_node structures 54A-3, and a set of leaf rcu_node structures 54B. For ease of understanding, the preempt_srcu_struct structure 52 will be referred to as "s sp" when describing the various fields (a.k.a. records) thereof. The srcu_node structures 54 will be referred to as "snp" when describing the various fields (a.k.a. records) thereof (see below). The rcu_node structures 54B will be referred to as "rnp" when describing the various fields (a.k.a. records) thereof (see below).

Example srcu_data structures 56A and rcu_data structures 56B are also shown in FIG. 3. For ease of understanding, the srcu_data structures 56A will be referred to as "sdp" when describing the various fields (a.k.a. records) thereof (see below), and the rcu_data structures 56B will be referred to as "rdp" when describing the various fields (a.k.a. records) thereof (see below). Note that in FIG. 3, the srcu_data structures 56A report to the leaf srcu_node structure(s) 54A-3, which in turn link to the intermediate srcu_node structure(s) 54A-2, which in turn link to the root srcu_node structure 54A-1. The rcu_data structures 56B report to the leaf rcu_node structure(s) 54B, but there are no higher-level rcu_node structures.

In the preempt_srcu_struct structure 52, the ssp→srcu_cb_mutex field prevents more than one additional PREEMPT_SRCU grace period from starting while the PREEMPT_SRCU subsystem 20 is initiating PREEMPT_SRCU callback invocation. The ssp→gp_lock field of the preempt_srcu_struct structure 52 protects the integrity of the ssp→srcu_gp_seq and ssp→srcu_gp_seq_needed fields (see below) of the preempt_srcu_struct structure. The ssp→srcu_gp_mutex field of the preempt_rcu_struct structure 52 is used to serialize PREEMPT_SRCU grace period processing work. The ssp→srcu_idx field of the preempt_srcu_struct structure 52 is for use by the PREEMPT_SRCU readers 21. It indicates the current active element of the sdp→srcu_lock_count[2] and sdp→srcu_unlock_count[2] arrays (see below) maintained by the srcu_data structures 56. These arrays are used by the PREEMPT_SRCU readers 21 as they enter and leave their PREEMPT_SRCU read-side critical sections.

The ssp→srcu_gp_seq field of the preempt_srcu_struct structure 52 maintains a current PREEMPT_SRCU grace period sequence number that indicates the grace period number and phase of the PREEMPT_SRCU grace period that is currently in effect. The ssp→srcu_gp_seq_needed field of the preempt_srcu_struct structure 52 records a PREEMPT_SRCU grace period number of a furthest-in-the-future PREEMPT_SRCU grace-period-start request (from PREEMPT_SRCU updaters 16) that has propagated to the root of the preempt_srcu_node tree (i.e., by the PREEMPT_SRCU funnel lock processing component 38). The ssp→work field of the preempt_srcu_struct structure 52 is used to schedule deferred callback invocation work by kernel workqueues.

The srcu_node structures 54A may be of the type found in existing Linux® implementations of Tree-SRCU. These data structures may be used by the PREEMPT_SRCU Grace Period Processing/Callback Invocation functionality 40 (FIG. 2) to advance PREEMPT_SRCU grace periods. Specifically, the srcu_node structures 54A propagate possibly concurrent requests for future PREEMPT_SRCU grace periods in an upward direction through the hybrid combining tree 54. The goal of each such propagation is to acquire the ssp→lock of the preempt_srcu_struct structure 52 and record a future PREEMPT_SRCU grace period request by incrementing the ssp→srcu_gp_seq_needed field. As discussed in more detail below in connection with the PREEMPT_SRCU Funnel Lock processing component 38, the hybrid combining tree 54 provides a form of funnel lock that reduces contention on the ssp→lock.

The snp→lock field of the srcu_node structures 54A is used to serialize srcu_node structure access by the PREEMPT_SRCU updaters 16. The snp→srcu_parent field contains a pointer to the rcu_node structure's parent node in the hybrid combining tree 54. The snp→srcu_have_cbs[ ] array of each srcu_node structure 54A tracks the furthest-in-the-future PREEMPT_SRCU grace period requested by any PREEMPT_SRCU callback under the jurisdiction of that srcu_node structure. In an embodiment, the snp→srcu_have_cbs[ ] array may have four elements that store different PREEMPT_SRCU grace period numbers, thereby allowing requests for four different PREEMPT_SRCU grace periods to be tracked concurrently while bounding contention.

The rcu_node structures 54B may be of the type found in existing Linux® implementations of Preemptible-RCU. These structures may be used by the PREEMPT_SRCU Grace Period Processing/Callback Invocation functionality 40 (FIG. 2) to drive existing PREEMPT_SRCU grace periods to completion by handling blocked readers and responding to delayed PREEMPT_SRCU grace periods. In particular, the rcu_node structures 54B may be used to enqueue blocked PREEMPT_SRCU readers 21, implement exact priority boosting for such readers, provide exact RCU CPU stall warnings, and deliver exact PREEMPT_SRCU grace period forward progress assistance. The functionality of the rcu_node structures 54B that would normally be used to implement Preemptible-RCU's per-processor quiescent-state tracking above the leaf level of the hybrid combining tree 54 is not utilized. Tree-SRCU's existing grace period management functionality is used instead.

The rnp→lock field of the rcu_node structures 54B is used to serialize access to the rcu_node structure when making updates thereto. The blkd_tasks field is a list header for a list that tracks blocked PREEMPT_SRCU readers 21 that have been preempted within a PREEMPT_SRCU read-side critical section, and which therefore may be delaying the end of a PREEMPT_SRCU grace period. The blkd_tasks list is also used identify blocked PREEMPT_SRCU readers 21 that would benefit from priority boosting to assist in completing their PREEMPT_SRCU read-side critical section processing. The rnp→gp_tasks field is a pointer to the first PREEMPT_SRCU reader 21 on the blkd_tasks list that is blocking a current PREEMPT_SRCU grace period. The rnp→boost_tasks field is a pointer to the first PREEMPT_SRCU reader 21 on the blkd_tasks list that requires priority boosting. The rnp→gpnum field tracks a current PREEMPT_SRCU grace period number known by the rcu_node structure 54B to have started, and the rnp→completed field tracks the last PREEMPT_SRCU grace period known by the rcu_node structure to have been completed. The rnp→qsmask field is a bitmask used to track processor quiescent states. The rnp→need_future_gp[ ] array of each rcu_node structure 54B is the Preemptible-RCU analog of the snp→srcu_have_cbs[ ] array of each srcu_node structure 54A. This array is not used by the PREEMPT_SRCU subsystem 20 in the illustrated embodiment of FIG. 3.

The non-leaf-level nodes and the leaf-level nodes of the hybrid combining tree 54 could respectively utilize data structures of either same or different data structure type. FIG. 3 illustrates an embodiment wherein different data structures are used, namely, the srcu_node structures 54A and the rcu_node structures 54B. In an alternate embodiment of the hybrid combining tree 54, the nodes could all utilize a single data structure type. For example, the various fields of the rcu_node structures 54B could be incorporated into the srcu_node structures 54A so as to form "enhanced" srcu_node structures. In that case, the PREEMPT_SRCU subsystem 20 could dispense with the rcu_node structures 54B and use the enhanced srcu_node structures 54A at all levels of the combining tree 54. However, there is a memory overhead penalty for doing this due to the fact that the fields incorporated from the rcu_node structures for driving existing PREEMPT_SRCU grace periods to completion need only be used at the leaf level of the hybrid combining tree 54. The non-leaf-level enhanced srcu_node structures would store no relevant information in such fields, but would carry them anyway due to all of the srcu_nodes structures of such an embodiment having the same enhanced format. One way around this would be revert to using different data structure types, namely, enhanced srcu_node structures 54 (that incorporate the rcu_node structure fields) at the leaf level of the hybrid combining tree 54 and non-enhanced srcu_node structures (that do not incorporate the rcu_node structure fields) at the non-leaf levels.

Per-Processor Data Structures

Turning now to the per-processor data structures of FIG. 3, the srcu_data structures 56A and the rcu_data structures 56B respectively store per-processor Tree SRCU information and per-processor Preemptible-RCU information.

In the srcu_data structures 56A, the sdp→srcu_lock_count[ ] array and the sdp→srcu_unlock_count[ ] array contain counters that are incremented by the PREEMPT_SRCU readers 21 as they respectively enter and leave their PREEMPT_SRCU read-side critical sections. Thus, the srcu_read_lock( ) primitive of the PREEMPT_SRCU Reader API 32 (discussed below in connection with FIG. 4) may be invoked by a PREEMPT_SRCU reader 21 to increment one of the sdp→srcu_lock_count[ ] counters at the beginning of a PREEMPT_SRCU read-side critical section. Similarly, the srcu_read_unlock( ) primitive of the PREEMPT_SRCU Reader API 32 (discussed below in connection with FIG. 4) may be invoked by a PREEMPT_SRCU reader 21 to increment one of the sdp→srcu_unlock_count[ ] counters at the end of a PREEMPT_SRCU read-side critical section. In FIG. 3, the value stored in the srcu_struct structure'ssp→srcu_idx field determines which element of the sdp→srcu_lock_count[ ] and sdp→srcu_unlock_count[ ] arrays is to be used during a given PREEMPT_SRCU grace period.

The sdp→srcu_cblist field of each srcu_data structure 56 represents a per-processor PREEMPT_SRCU callback list. The sdp→srcu_cblist field contains PREEMPT_SRCU callbacks in association with the PREEMPT_SRCU grace period numbers that determine when the callbacks may be invoked. The sdp→srcu_gp_seq_needed field of each srcu_data structure 56 records the furthest-in-the-future PREEMPT_SRCU grace period requested for the processor 4 associated with the srcu_data structure. The sdp→work field of the srcu_data structures 56 provides a kernel workqueue context for invoking PREEMPT_SRCU callbacks.

In the rcu_data structures 56B, the rdp→cpu_no_qs field is used by the PREEMPT_SRCU subsystem 20 to alert the processor 4 associated with the rcu_data structure that the processor has not yet reported a quiescent state for the current PREEMPT_SRCU grace period. The rdp→mynode field maintains a pointer the rcu_data structure's associated leaf rcu_node structure 54B. The rdp→grpmask field is a bitmask that can be applied to the leaf rcu_node structure's rnp→qsmask to manipulate the →qsmask bit of the rcu_data structure's associated processor 4. The rdp→ticks_this_gp field counts the number of scheduling-clock ticks the processor 4 has handled during and after the last PREEMPT_SRCU grace period known to that processor. The rdp→rcu_urgent_qs flag is used to indicate whether a quiescent state is needed for the processor 4 associated with the rcu_data structure 56B.

The per-processor data structures of the PREEMPT_SRCU subsystem 20 that respectively store Tree-SRCU information and Preemptible-RCU information may be of the same or different type. In FIG. 3, different data structures types are used, namely, the srcu_data structures 56A and the rcu_data structures 56B. In an alternate embodiment, a single data structure type could be used. For example, the various fields of the rcu_data structures 56B used to drive existing PREEMPT_SRCU grace periods to completion could be incorporated into the srcu_data structures 56A to provide "enhanced" srcu_data structures. In that case, the PREEMPT_SRCU subsystem 20 could dispense with the rcu_data structures 56A.

The rcu_data structures 56B of existing Preemptible-RCU implementations normally maintain a number of additional fields that are not needed by the PREEMPT_SRCU subsystem 20. Among such fields is the rdp→cblist field and an associated segmented Preemptible-RCU callback list used by Preemptible RCU updaters to post RCU callbacks. Insofar as the PREEMPT_SRCU subsystem 20 uses the srcu_data structures 56A for callbacks, the corresponding functionality provided by the rcu_data structures 54B is not required. This is indicated in FIG. 3.

PREEMPT_SRCU Read-Side Processing

Figure 4:
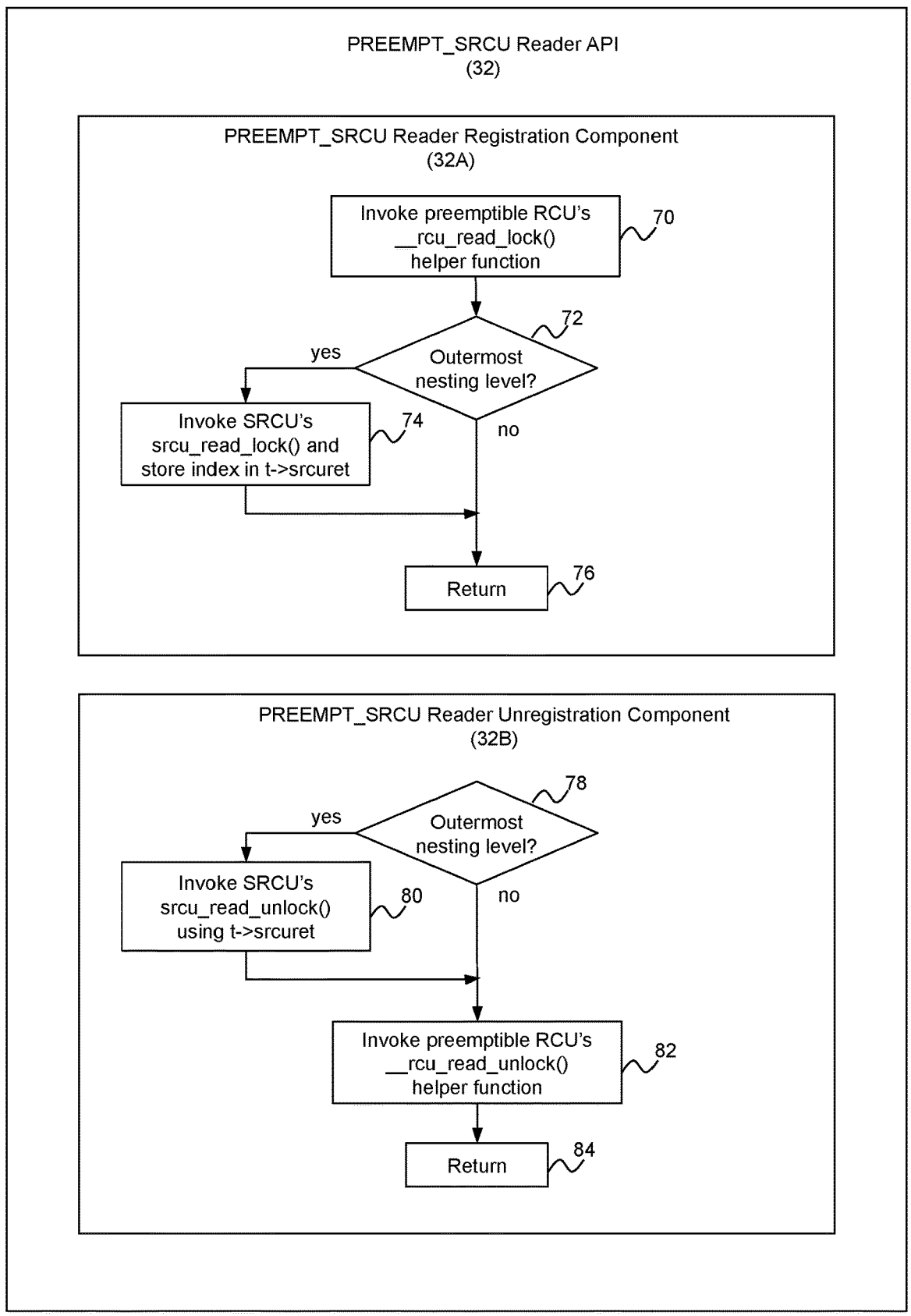
FIG. 4 is a flow diagram showing example PREEMPT_SRCU read-side processing operations, including reader registration processing and reader-unregistration processing.

Turning now to FIG. 4, example PREEMPT_SRCU read-side processing is shown that may be implemented by the PREEMPT_SRCU Reader API 32 (FIG. 2). This read-side processing includes the PREEMPT_SRCU Reader Registration Component 32A, which may be implemented by an augmented version of the Linux® Preemptible-RCU function named rcu_read_lock( ). The read-side processing further includes the PREEMPT_SRCU Reader Unregistration component 32B, which may be implemented by an augmented version of the Linux® Preemptible-RCU function named rcu_read_unlock( ). The PREEMPT_SRCU Reader Registration Component 32A is invoked by PREEMPT_SRCU readers 21 when entering their PREEMPT_SRCU read-side critical sections. The PREEMPT_SRCU Reader Unregistration Component 32B is invoked by PREEMPT_SRCU readers when leaving their PREEMPT_SRCU read-side critical sections.

In an embodiment, the PREEMPT_SRCU Reader Registration Component 32A may be implemented by augmenting the rcu_read_lock( ) function of Preemptible-RCU to invoke SRCU's srcu_read_lock( ) primitive before returning, but only if the augmented rcu_read_lock( ) invocation is not nested within another such invocation.

In block 70 of FIG. 4, the PREEMPT_SRCU Reader Registration Component 32A invokes Preemptible-RCU's _rcu_read_lock( ) helper function. This function increments the t→read_lock_nesting counter 60 (FIG. 2) in the PREEMPT_SRCU reader's task_struct structure. Block 72 of FIG. 4 checks the just-incremented t→read_lock_nesting counter 60 to determine whether its value is indicative of the augmented rcu_read_lock( ) invocation representing an outermost nesting level of a set of nested rcu_read_lock( ) invocations. If so, block 74 invokes SRCU's srcu_read_lock( ) function. This function uses the ssp→srcu_idx value maintained by the preempt_srcu_struct structure 52 (FIG. 3) to increment the appropriate sdp→srcu_lock_count[ ] element of the PREEMPT_SRCU reader's srcu_data structure 56. Upon completion, the srcu_read_lock( ) function returns the ssp→srcu_idx value, and block 74 stores this value in the t→srcuret field 58 (FIG. 2) of the PREEMPT_SRCU reader's task_struct structure. The augmented rcu_read_lock( ) function that may be implemented by the PREEMPT_SRCU Reader Registration Component 32A returns following block 74, or following block 72 if the current augmented rcu_read_lock( ) invocation is determined to be a nested invocation.

In an embodiment, the PREEMPT_SRCU Reader Unregistration Component 32B may be implemented by augmenting the rcu_read_unlock( ) function of Preemptible-RCU to invoke SRCU's srcu_read_unlock( ) primitive before returning, but only if the augmented rcu_read_unlock( ) invocation is not nested within another such invocation.

In block 78 of FIG. 4, the PREEMPT_SRCU Reader Unregistration Component 32B checks the t→read_lock_nesting counter 60 (FIG. 2) in the PREEMPT_SRCU reader's t ask struct structure to determine whether its value is indicative of the augmented rcu_read_unlock( ) invocation representing an outermost nesting level of a set of nested rcu_read_unlock( ) invocations. If true, block 80 invokes the srcu_read_unlock( ) function, passing it the index value stored in the t→srcuret field 58 (FIG. 2) of the PREEMPT_SRCU reader's task_struct structure. The srcu_read_unlock( ) function uses this index value to increment the appropriate sdp→srcu_unlock_count[ ] counter element of the PREEMPT_SRCU reader's srcu_data structure 56. Following block 80, or following block 78 if the current augmented rcu_read_unlock( ) invocation is determined to be a nested invocation, block 82 invokes Preemptible-RCU's _rcu_read_unlock( ) helper function. This function decrements the t→read_lock_nesting counter 60 (FIG. 2) in the PREEMPT_SRCU reader's task_struct structure. If the t→read_lock_nesting counter 60 has a value indicating that the outermost nesting level has completed, the _rcu_read_unlock( ) helper function may also invoke the PREEMPT_SRCU Reader Unregistration Special Processing 90 shown in FIG. 5. The PREEMPT_SRCU Reader Unregistration Component 32B returns following block 84.

Figure 5:
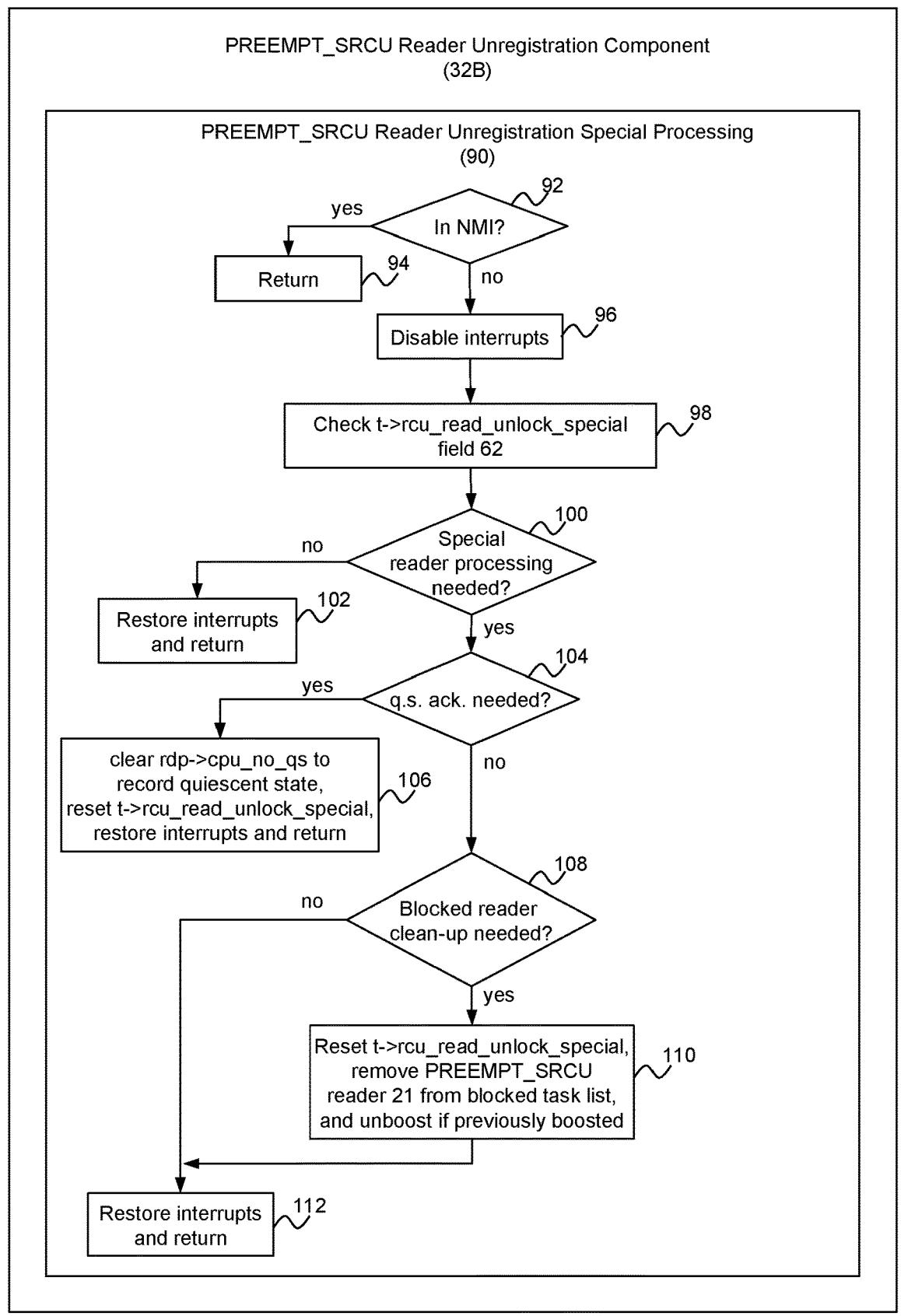
FIG. 5 is a flow diagram showing example PREEMPT_SRCU reader unregistration special processing operations.

Turning now to FIG. 5, an embodiment of the PREEMPT_SRCU Reader Unregistration Special Processing 90 may be implemented by a modified version of Preemptible-RCU's rcu_read_unlock_special( ) function. The modifications account for the fact that expedited grace periods are handled by the Tree-SRCU functionality of PREEMPT_SRCU rather than the Preemptible-RCU functionality.

Block 92 of FIG. 5 checks whether the processor 4 is running an NMI (non-maskable-interrupt) handler, and if so block 94 returns to the caller. The reason for this early exit is that NMI handlers cannot block and cannot safely manipulate state. Block 96 disables interrupts and block 98 checks the t→rcu_read_unlock_special field 62 (see FIG. 2) in the PREEMPT_SRCU reader's task_struct structure. As previously discussed, the t→rcu_read_unlock_special field 62 indicates whether the PREEMPT_SRCU reader 21 blocked or was preempted during its PREEMPT_SRCU read-side critical section, or if a processor quiescent state is needed. Block 100 checks whether the t→rcu_read_unlock_special field 62 indicates a need for special reader processing, and if not, block 100 returns to the caller. If not, block 102 restores interrupts and returns to the caller.

If block 100 determines that the →rcu_read_unlock_special field 62 indicates a need for special reader processing, the specific type of special processing needs to be determined. Block 104 checks whether the special reader processing is to acknowledge an alert from the PREEMPT_SRCU subsystem 20 that a quiescent state is needed for the processor 4 running the PREEMPT_SRCU reader 21. If so, block 106 provides that acknowledgement by clearing the rpd→cpu_no_qs field in the processor'srcu_data structure 56B (to record the quiescent state), clearing the t→rcu_read_unlock_special field 62, restoring interrupts and returning.

Block 108 checks whether the special reader processing is to clean up as a result of the PREEMPT_SRCU reader 21 having been preempted or blocked within a PREEMPT_SRCU read-side critical section. If the PREEMPT_SRCU reader 21 blocked or was preempted, the PREEMPT_SRCU reader's task_struct structure will have been linked into the rnp→blkd_tasks list of the leaf rcu_node structure 54B to which the reader's srcu_data structure 56 reports. This task_struct structure enqueuing operation is described in more detail below in connection with FIG. 8. In addition, the scheduling priority of the PREEMPT_SRCU reader 21 may have been boosted in order to facilitate quicker rescheduling of the reader so that it may resume and hopefully complete its PREEMPT_SRCU read-side critical section. This priority boosting operation is described in more detail below in connection with FIG. 9. Block 110 clears the t→rcu_read_unlock_special field 62 (FIG. 2), then cleans up by removing the PREEMPT_SRCU reader 21 from the rnp→blkd_tasks list on which it was enqueued and unboosting the reader if it was previously boosted. Block 112 is reached following block 110 or if block 108 determines that blocked PREEMPT_SRCU reader clean up is not indicated. Block 112 restores interrupts and returns to the caller.

Update-Side Processing

The PREEMPT_SRCU Updater API 34 (FIG. 2) may be implemented using existing Linux® TREE_SRCU update-side functionality. This functionality is represented by the PREEMPT_SRCU callback registration component 36 and the PREEMPT_SRCU funnel lock processing component 38. In an embodiment, Preemptible-RCU's update-side functions can be mapped to their Tree-SRCU counterparts so that PREEMPT_SRCU may use the same interface as Preemptible-RCU.

The PREEMPT_SRCU callback registration component 36 is invoked by the SRCU updaters 16 in order to register PREEMPT_SRCU callbacks at srcu_data structures 56A (FIG. 3) associated with the processors 4 that run the updaters. The PREEMPT_SRCU callbacks are enqueued on the srcu_data structure's sdp→srcu_cblist. The PREEMPT_SRCU callback registration component 36 then computes the future PREEMPT_SRCU grace period number that the newly-enqueued PREEMPT_SRCU callback needs to complete in order for the callback to be invoked, and updates the sdp→srcu_gp_seq_needed field (as needed) to record the fact that the future PREEMPT_SRCU grace period is being requested by this srcu_data structure 56A.

The PREEMPT_SRCU callback registration component 36 invokes the PREEMPT_SRCU funnel lock processing component 38 to propagate the future PREEMPT_SRCU grace period requests up the hybrid combining tree 54 in a leaf-to-root direction for recordation in the ssp→srcu_gp_seq_needed field of the preempt_srcu_struct structure 52. The rnp→need_future_gp[ ] array of the rcu_node structures 54B and the snp→srcu_have_cbs[ ] array of the srcu_node structures 54A are used for the future PREEMPT_SRCU grace period request propagation. The first PREEMPT_SRCU updater 16 whose future PREEMPT_SRCU grace period request reaches the root srcu_node structure 54A-1 will acquire the ssp→gp_lock of the preempt_srcu_struct structure 52 and update the latter's ssp→srcu_gp_seq_needed field. The PREEMPT_SRCU Grace Period Processing/Callback Invocation functionality 40 will react by ensuring that a new grace period is started when it is appropriate to do so. Concurrent requests for same future PREEMPT_SRCU grace periods will note the update to the ssp→srcu_gp_seq_needed field, and abandon their propagations. In this way, contention on the ssp→lock will be reduced.

SRCU Grace Period Processing and Callback Invocation

In embodiment, the Grace Period Processing/Callback Invocation functionality 40 may be implemented as a hybrid combination of functionality found in existing Linux® implementations of Preemptible-RCU and Tree-SRCU. This hybrid functionality utilizes the rcu_node structures 54B at the leaf level of the hybrid combining tree 54 (FIG. 3) to implement Preemptible-RCU's support for exact priority boosting of preempted or blocked PREEMPT_SRCU readers 21, provide exact RCU CPU stall warnings, and deliver exact PREEMPT_SRCU grace period forward progress assistance. Preemptible-RCU's support for per-processor quiescent-state tracking and grace period management above the leaf level of the hybrid combining tree 54 is not utilized. Instead, the Grace Period Processing/Callback Invocation functionality 40 uses the srcu_node structures 54A and the preempt_srcu_struct structure 52 to compute PREEMPT_SRCU grace periods. The Grace Period Processing/Callback Invocation functionality 40 uses the srcu_data structures 56A to manage PREEMPT_SRCU callbacks. The rcu_data structures 56B are used for only limited purposes in support of Preemptible RCU's priority boosting, stall warning and forward progress assistance operations.

Augmented TREE-SRCU Functionality

Existing Tree-SRCU implementations utilize a workqueue function named process_srcu( ) to handle Tree-SRCU grace periods and callback processing. In an embodiment, an augmented version of this function may be used to manage PREEMPT_SRCU grace periods and process PREEMPT_SRCU callbacks. Relevant operations of the augmented process_srcu( ) function are illustrated in FIG. 6 by the PREEMPT_SRCU Grace Period Management/Callback Processing 200.

Figure 6:
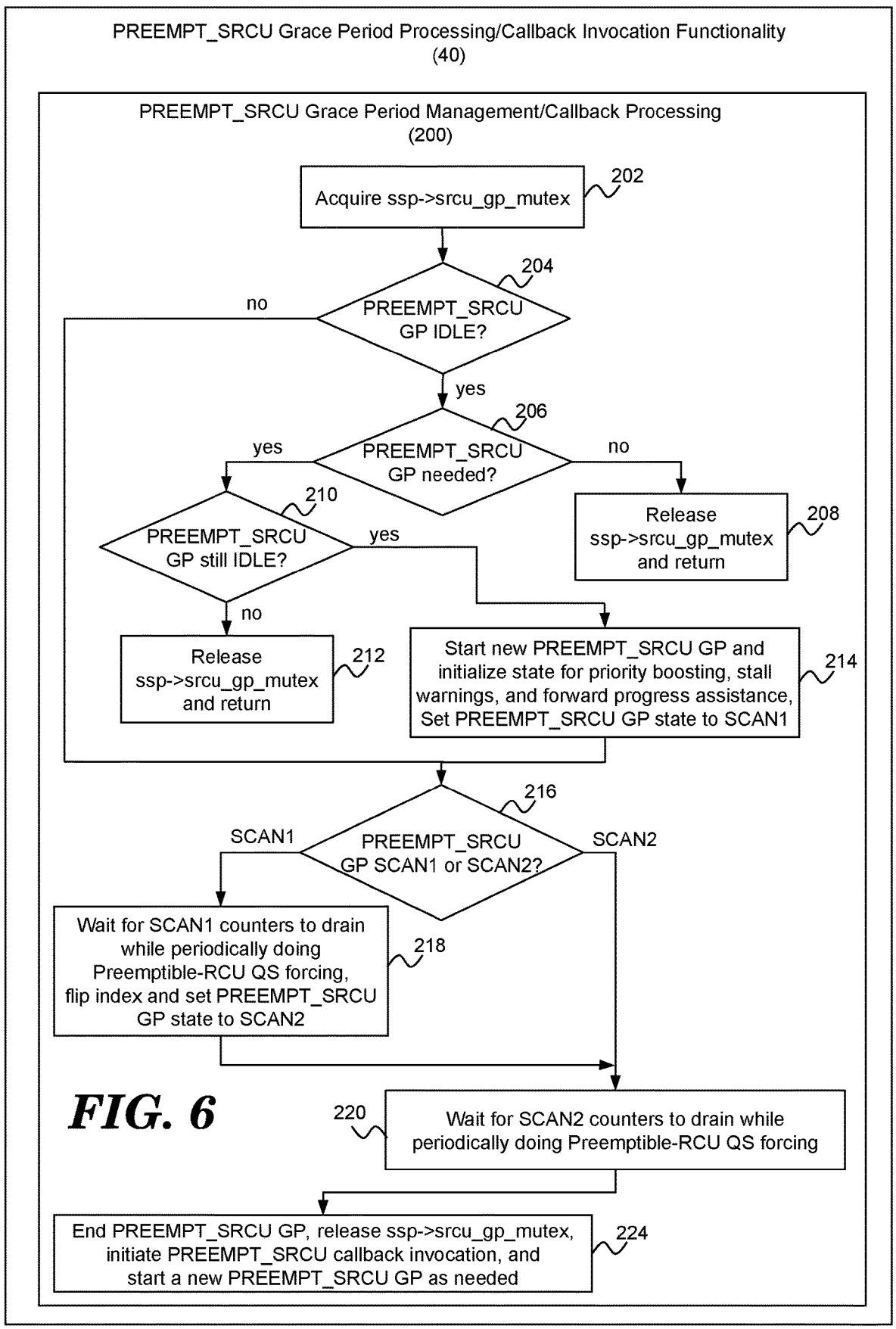
FIG. 6 is a flow diagram showing example PREEMPT_SRCU Grace Period Management/Callback Processing operations.

Block 202 of FIG. 6 acquires the ssp→srcu_gp_mutex of the preempt_srcu_struct structure 52. Block 204 checks to determine whether the PREEMPT_SRCU grace period state of the PREEMPT_SRCU subsystem is IDLE, meaning there is no PREEMPT_SRCU grace period in progress. This check may be performed by inspecting the bottom phase bits of the ssp→srcu_gp_seq field in the preempt_srcu_struct structure 52. If the IDLE state is detected, block 206 checks whether a new PREEMPT_SRCU grace period is needed. This will be the case when the preempt_srcu_struct structure's ssp→srcu_gp_seq field is less than the ssp→srcu_gp_seq_needed field.

Block 208 of FIG. 6 is reached when block 206 determines that no new PREEMPT_SRCU grace period is needed. Block 208 releases the ssp→srcu_gp_mutex and returns to the caller. Block 210 is reached when block 206 determines that a new PREEMPT_SRCU grace period is needed. In that case, block 210 checks whether the PREEMPT_SRCU grace period state of the PREEMPT_SRCU subsystem is still IDLE. If not, a new PREEMPT_SRCU grace period has already started, so block 212 releases the ssp→srcu_gp_mutex and returns to the caller.

On the other hand, if block 210 determines that the PREEMPT_SRCU grace period state of the PREEMPT_SRCU subsystem is still IDLE, block 214 starts the new PREEMPT_SRCU grace period. Block 214 also initializes state in the rcu_node structures 54B for PREEMPT_SRCU reader priority boosting, RCU CPU stall warning support, and PREEMPT_SRCU grace period forward progress assistance. Block 214 additionally manipulates the phase bits of the ssp→srcu_gp_seq field in the preempt_srcu_struct structure 52 to change the PREEMPT_SRCU grace period state to SCAN1 (see below).

Initializing state for PREEMPT_SRCU reader priority boosting (as performed in block 214) may include setting the rnp→qsmask bits of the rcu_node structures 54B for all currently online processors 4. In addition, each rcu_node structure's rnp→qp_tasks field may be set to reference the first element of the rnp→blkd_tasks list. Furthermore, an RCU-boost kthread may be started for each rcu_node structure 54B, if one does not already exist, to setup for possible future priority boosting. In an embodiment, the Linux® rcu_preempt_boost_start_gp( ) function may be used for this purpose.

Initializing state for RCU CPU stall warnings and PREEMPT_SRCU grace period forward progress assistance (as performed in block 214) may include noting the start time of the PREEMPT_SRCU grace period and, based on the start time, calculating a future stall check time together with a future time to reschedule reluctant processors 4. In an embodiment, the Linux® record_gp_stall_check_time( ) function may be used for this purpose.

Block 216 of FIG. 6 checks whether the PREEMPT_SRCU grace period is in a SCAN1 state or a SCAN2 state. The SCAN1 and SCAN2 states respectively signify scanning on either a first or second array index of the sdp→srcu_lock_count[ ] and sdp→srcu_unlock_count[ ] counter arrays of the srcu_data structures 56A to determine when all PREEMPT_SRCU readers 21 counted by that array index have completed their PREEMPT_SRCU read-side critical sections. If the SCAN 1 state is in effect, block 218 waits for the SCAN1 array index counters to drain, meaning that for this array index and taking into account all of the srcu_data structures 56A, the cumulative sdp→srcu_lock_count[ ] value equals the cumulative sdp→srcu_unlock_count[ ] value.

When the SCAN1 array index counters drain, block 218 flips the counter index and manipulates the phase bits of the ssp→srcu_gp_seq field in the preempt_srcu_struct structure 52 to set the PREEMPT_SRCU grace period state to SCAN2. Block 220 is reached following block 218 or if block 216 determines that the SCAN2 PREEMPT_SRCU grace period state is in effect. Block 220 waits for the SCAN2 array index counters to drain, meaning that for this array index and taking into account all of the srcu_data structures 56A, the cumulative sdp→srcu_lock_count[ ] value equals the cumulative sdp→srcu_unlock_count[ ] value.

When the SCAN2 array index counters drain, block 224 ends the PREEMPT_SRCU grace period, releases the ssp→srcu_gp_mutex, initiates PREEMPT_SRCU callback invocation, and starts a new PREEMPT_SRCU grace period if one is needed. To prevent more than one additional PREEMPT_SRCU grace period from being started, the ssp→srcu_cb_mutex may be acquired before ending the current PREEMPT_SRCU grace period. The ssp→srcu_cb_mutex may be thereafter released following PRE-EMPT_SRCU callback initiation.

In an embodiment, the respective SCAN1 and SCAN1 operations of blocks 218 and 220 may implement periodic rounds of Preemptible-RCU quiescent state forcing, such as by invoking the Linux® rcu_gp_fqs( ) function. Among other things, the rcu_gp_fqs( ) function invokes the Linux® force_qs_rnp( ) function, which in turn may invoke a modified version of the Linux® rcu_initiate_boost( ) function that initiates priority boosting for preempted or blocked PREEMPT_SRCU readers 21, as described below in connection with FIG. 8.

The rcu_gp_fqs( ) function may also directly invoke the dyntick_save_progress_counter( ) and rcu_implicit_dynticks_qs( ) functions to sample a PREEMPT_SRCU reader's t→rcu_read_lock_nesting field on any holdout processors 4. Both functions initially test the PRE-EMPT_SRCU reader's t→rcu_read_lock_nesting field, and if no PREEMPT_SRCU read-side critical section processing is indicated, cause the rnp→qsmask bit of the processor running the PREEMPT_SRCU reader to be cleared in the appropriate rcu_node structure 54B. Advantageously, this operation accounts for processors 4 that are idle or offline.

Priority Boosting

PREEMPT_SRCU reader priority boosting may be assisted by appropriate handling of PREEMPT_SRCU readers 21 that are preempted or block within their PRE-EMPT_SRCU read-side critical sections, such as by enqueueing those tasks on the rnp→blkd_tasks lists of the rcu_node structures 54B. In Linux® implementations of Preemptible-RCU, the OS scheduler invokes a function named rcu_note_context_switch( ) as part of its task scheduling operations. Among other things, the rcu_note_context_switch( ) function checks the current task's t→rcu_read_lock_nesting field to determine if it is within a Preemptible-RCU read-side critical section. If so, the task's t→rcu_read_unlock_special field is set to indicate that assistance from the PREEMPT_SRCU Reader Unregistration Special Processing 90 (FIG. 5) is needed to clean up as a result of the task having been preempted or blocked within an RCU read-side critical section (see discussion of FIG. 5, block 108 above).

The rcu_note_context_switch( ) function also invokes a function named rcu_preempt_ctxt_queue( ) to enqueue the task on the rnp→blkd_tasks list of an appropriate rcu_node structure 54B. In an embodiment, the same task queueing may be performed using a modified version of the rcu_preempt_ctxt_queue( ) function. The modified rcu_preempt_ctxt_queue( ) function may be implemented by the OS scheduler. The modification stems from the fact that the context-switch queueing does not need to interact directly with PREEMPT_SRCU grace periods, which are instead dealt with by the PREEMPT_SRCU Grace Period Processing/Callback Invocation functionality 20, as previously described. One consequence of this is that context-switch queueing no longer needs to concern itself with expedited grace periods, which in turn allows a simplified PRE-EMPT_SRCU Reader Queueing operation 300 to be implemented in the manner shown in FIG. 7.

Figure 7:
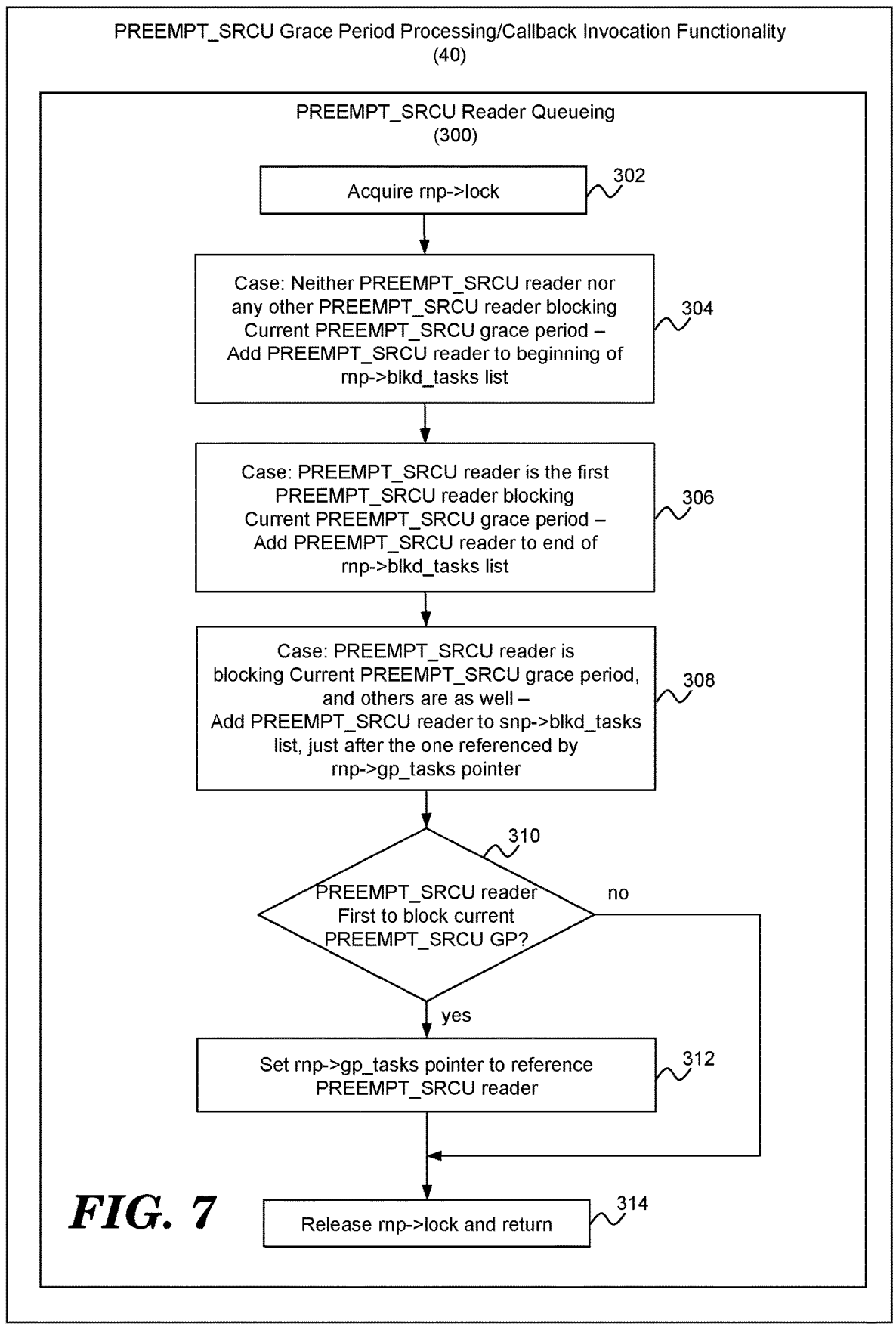
FIG. 7 is a flow diagram showing example PREEMPT_SRCU Reader queuing operations.

Block 302 of FIG. 7 acquires the rnp→lock for the rcu_node structure 54B associated with the rcu_data structure 56B assigned to the PREEMPT_SRCU reader's processor 4. Block 304 is implemented in a case where a PREEMPT_SRCU reader 21 is not blocking the current PREEMPT_SRCU grace period (i.e., its processor's rnp→qsmask bit is not set) and neither are any others (i.e., the rnp→gp_tasks pointer is NULL). In this case, block 304 adds the PREEMPT_SRCU reader 21 to the beginning of the rcu_node structure's rnp→blkd_tasks list. Block 306 is implemented in the case where the PREEMPT_SRCU reader 21 is the first to block the current PREEMPT_SRCU grace period (i.e., its processor's rnp→qsmask bit is set and the rnp→gp_tasks pointer is NULL). In this case, block 306 adds the PREEMPT_SRCU reader 21 to the end of the rcu_node structure's rnp→blkd_tasks list. Block 308 is implemented in the case where the PREEMPT_SRCU reader 21 is blocking the current PREEMPT_SRCU grace period (i.e., its processor's rnp→qsmask bit is set), but others are as well (i.e., the rnp→gp_tasks pointer is not NULL). In this case, block 308 adds the PREEMPT_SRCU reader 21 to the rcu_node structure's rnp→blkd_tasks list, with the reader being placed just after the one referenced by the rnp→gp_tasks pointer. If block 310 determines that the PREEMPT_SRCU reader 21 is the first to block the current PREEMPT_SRCU grace period, block 312 sets the rnp→gp_tasks pointer to reference this PREEMPT_SRCU reader. Following block 312 or the "no" path out of block 310, block 314 releases the rnp→lock for the current rcu_node structure 54B and returns to the caller.

Figure 8:
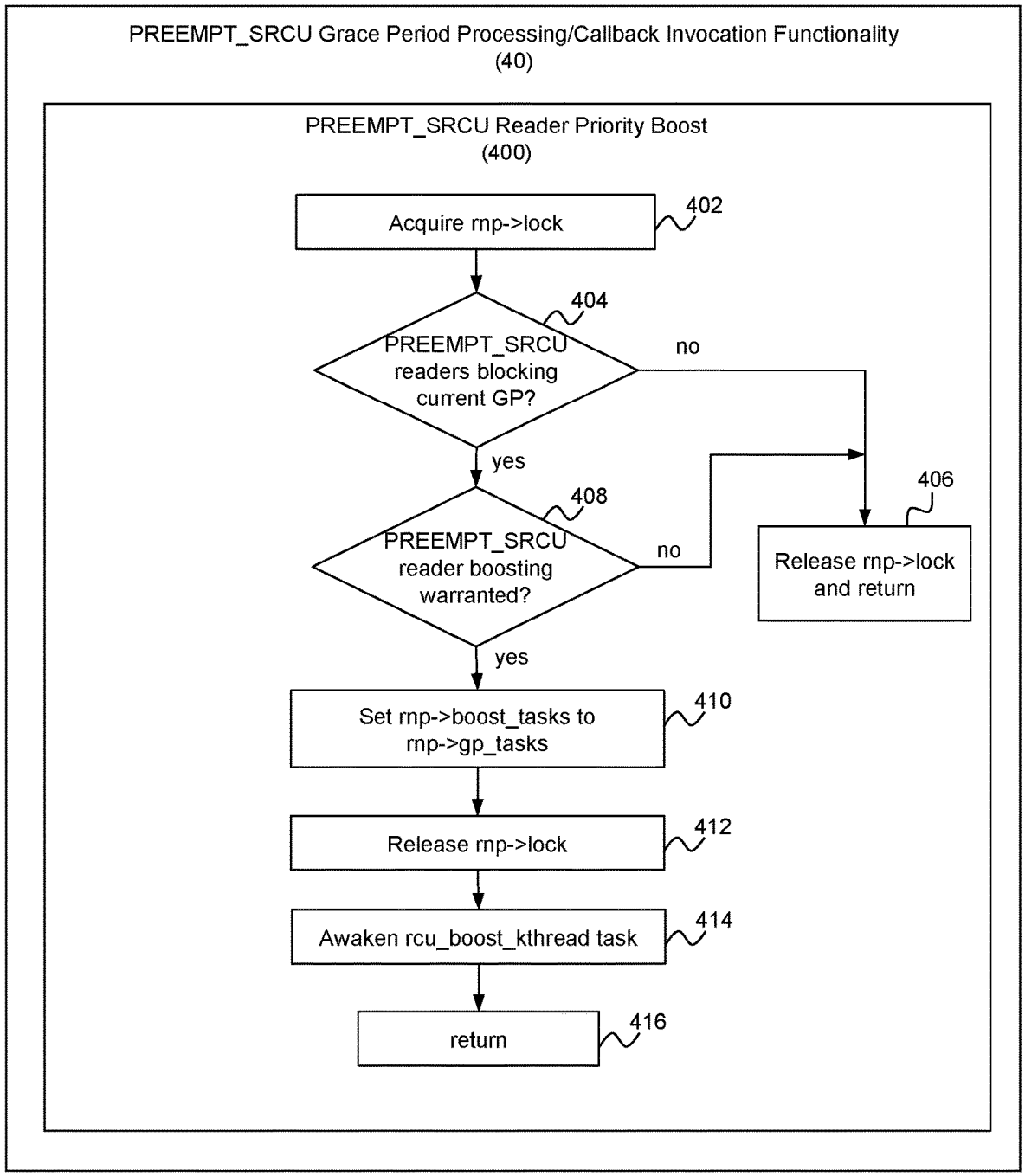
FIG. 8 is a flow diagram showing example PREEMPT_SRCU Reader Priority Boosting operations.

Turning now to FIG. 8, example PREEMPT_SRCU Reader Priority Boost processing 400 is illustrated that operates on the rnp→blkd_tasks lists of the various rcu_node structures 54B. This functionality may be implemented as part of the quiescent state forcing operations previously discussed in connection with FIG. 6, blocks 218 and 220. As previously noted, the quiescent state forcing operations may be performed by invoking the Linux® rcu_gp_fqs( ) function, which in turn invokes the Linux® force_qs_rnp( ) function, which in turn may invoke a modified version of the Linux® rcu_initiate_boost( ) function that initiates priority boosting for preempted or blocked PREEMPT_SRCU readers 21 on each rcu_node structure 54B. The PREEMPT_SRCU Reader Priority Boost processing 400 represents the modified rcu_initiate_boost( ) function.

Block 402 of FIG. 8 acquires the rnp→lock of the current rcu_node structure 54B. Block 404 checks the rcu_node structure's rnp→gp_tasks tasks pointer to determine if there are any PREEMPT_SRCU readers 21 blocking the current PREEMPT_SRCU grace period (i.e., the pointer is NULL). If not, block 406 releases the rnp→lock and returns. Block 408 determines whether PREEMPT_SRCU reader boosting is warranted. This condition may be indicated when (1) the rcu_node structure's rnp→gp_tasks pointer is not NULL, (2) the rcu_node structure's rnp→boost_tasks pointer is NULL, (3) the rcu_node structure's rnp→qsmask bits are all cleared (indicating that all processors 4 that report to the rcu_node structure have passed through a quiescent state), and (4) a predetermined amount of time has elapsed since the start time of the current PREEMPT_SRCU grace period.

If block 408 does not indicate that PREEMPT_SRCU reader boosting is warranted, block 406 releases the rnp→lock and returns. If block 408 does indicate that PREEMPT_SRCU reader boosting is warranted, block 410 sets the rcu_node structure's rnp→boost_tasks pointer equal to the rnp→gp_tasks pointer. Following block 410, block 412 releases the rnp→lock. Block 414 then awakens an rcu_boost_kthread task that handles the PREEMPT_SRCU reader priority boosting. In an embodiment, the rcu_boost_kthread task may be implemented in accordance with Preemptible RCU, but with operations relating to expedited grace periods being eliminated due to the fact that such grace periods are handled by the Tree-SRCU grace period management operations of the PREEMPT_SRCU Grace Period Processing/Callback Invocation functionality 40. Following block 414, block 416 returns.

Stall Warnings and Forward Progress Assistance

Preemptible-RCU conventionally uses the scheduling clock interrupt handler to determine when processors have passed through an RCU quiescent state, when to issue RCU CPU stall warnings, and when to provide forward progress assistance. In an embodiment, a modified version of the rcu_check_callbacks( ) function may be implemented by the PREEMPT_SRCU Grace Period Processing/Callback Invocation functionality 40. This modified processing is represented by the PREEMPT_SRCU Stall Warning/Forward Progress processing 500 of FIG. 9.

Figure 9:
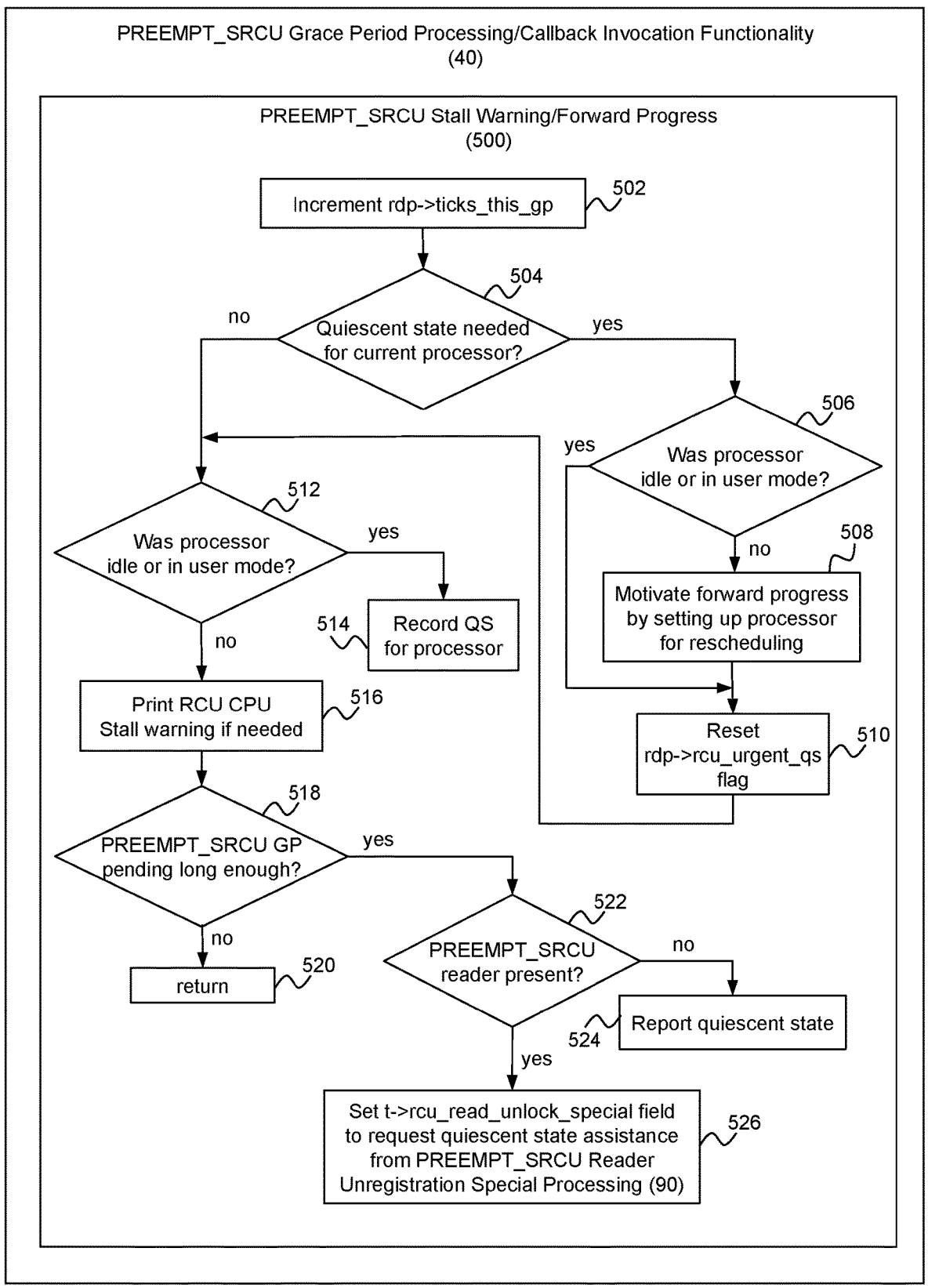
FIG. 9 is a flow diagram showing example PREEMPT_SRCU Stall Warning/Forward Progress operations.

In FIG. 9, block 502 increments the rdp→ticks_this_gp counter on the rdp→data structure 56B for the processor 4 that received the scheduling clock interrupt. This counter data may used for subsequent RCU CPU stall warnings. Block 504 checks the rcu_data structure's rdp→rcu_urgent_qs flag to determine whether a quiescent state is needed for the current processor 4. In Preemptible-RCU, the rdp→rcu_urgent_qs flag is set by a function named rcu_implicit_dynticks_qs( ) in response to a grace period reaching a sufficient age. As previously noted, PREEMPT_SRCU may invoke a function named rcu_gp_fqs( ) as part of the Preemptible-RCU quiescent state forcing performed in blocks 218 and 220 of FIG. 6 (see above). The rcu_gp_fqs( ) function may invoke the rcu_implicit_dynticks_qs( ) function and thereby set the rdp→rcu_urgent_qs flag if needed.

If block 504 determines that a quiescent state is needed for the current processor 4, block 506 checks whether the current processor 4 was interrupted from either idle or user mode processing. If so, block 508 motivates forward progress by requesting conditional rescheduling of the processor 4. In an embodiment, block 508 may be implemented by directing a Linux® scheduler function named resched_cpu( ) at the current processor 4. Following block 508 or the "no" path out of block 56, block 510 resets the rcu_data structure's rdp→rcu_urgent_qs flag.

Block 512 of FIG. 9 is reached following block 510 or from the "no" path out of block 504. Block 512 checks whether the current processor 4 was interrupted from either idle or user mode processing. If so, block 514 records a quiescent state for the processor 4 by clearing its bit in the rnp→qsmask field of the rcu_node structure 54B reported to by the processor'srcu_data structure 56B. Block 516 prints an RCU CPU stall warning if one is needed. Block 518 checks whether the current PREEMPT_SRCU grace period has been pending for a sufficient time period, e.g., for one second or more. If not, block 520 returns to the caller.

Block 522 of FIG. 9 checks the t→rcu_read_lock_nesting field 60 (FIG. 2) of the task running on the current processor 4 to determine if the task is a PREEMPT_SRCU reader 21 running inside a PREEMPT_SRCU read-side critical section. If not, block 524 reports a quiescent state for the current processor 4 by clearing its rnp→qsmask bit in the rcu_node structure 54B reported to by the processor'srcu_data structure 56B. In an embodiment, block 524 may implement a modified version of Preemptible-RCU's rcu_report_qs_rnp( ) function. In this modified version, the function no longer walks up a tree of rcu_node structures, which does not exist in PREEMPT_SRCU. Instead, the function operates only on the rcu_node structures 54B at the leaf level of the hybrid combining tree 54. If block 522 determines that the current task is a PREEMPT_SRCU reader 21 running inside a PREEMPT_SRCU read-side critical section, block 526 sets the t→rcu_read_unlock_special field in the reader's task structure to request quiescent state assistance from the PREEMPT_SRCU Reader Unregistration Special Processing 90 when the reader leaves its PREEMPT_SRCU read-side critical section (per block 106 of FIG. 5).

Accordingly, a technique has been disclosed for replacing Preemptible-RCU with an Augmented Tree-SRCU implementation, denominated PREEMPT_SRCU, that combines elements of Tree-SRCU with elements of Preemptible-RCU.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A computer-implemented method, comprising:
   reducing memory requirements within a computer system, the reducing comprising:
      providing an augmented sleepable read-copy update (PREEMPT_SRCU) subsystem that comprises a PREEMPT_SRCU grace period processing/callback invocation component and a PREEMPT_SRCU subsystem data structure, wherein:
         the PREEMPT_SRCU grace period processing/callback invocation component manages PREEMPT_SRCU grace periods and handles PREEMPT_SRCU callbacks; and
         the PREEMPT_SRCU subsystem data structure comprises a hybrid combining tree, the hybrid combining tree including non-leaf-level nodes and leaf-level nodes:
            a set of first nodes storing tree-based sleepable read-copy update (Tree-SRCU) information, the set of first nodes including both non-leaf-level nodes and leaf-level nodes; and
            a set of second nodes storing, at least in part, preemptible read-copy update (Preemptible-RCU) information, the set of second nodes including only leaf-level nodes; and
         the PREEMPT_SRCU subsystem stores in a memory:
            a set of per-processor Tree-SRCU information comprising PREEMPT_SRCU reader registration/unregistration counters to compute the end of PREEMPT_SRCU grace periods and PREEMPT_SRCU callback lists for managing PREEMPT_SRCU callbacks posted by PREEMPT_SRCU updaters;
            a set of per-processor Preemptible-RCU quiescent state tracking and timing information; and
            wherein the per-processor Tree SRCU information and the per-processor Preemptible-RCU information are respectively stored in per-processor data structures as part of the PREEMPT_SRCU subsystem; and
      executing, by one or more processors, the augmented sleepable read-copy update (PREEMPT_SRCU) subsystem within a computer system, the executing comprising:
         advancing one or more PREEMPT_SRCU grace periods, the advancing updating references to a new copy of data while previous copies tied to old grace periods are freed when no longer referenced, where the advancing uses the set of first nodes of the hybrid combining tree storing tree-based sleepable read-copy update (Tree-SRCU) information to track processes accessing the managed data; and handling one or more processes which have locked the data managed by PREEMPT_SRCU grace periods, where the handling responds to delayed PREEMPT_SRCU grace periods by increasing the process priority using the set of second nodes of the hybrid combining tree storing, at least in part, preemptible read-copy update (Preemptible-RCU) information.

2. The method of claim 1, wherein the first nodes and the second nodes respectively utilize data structures of either the same or different data structure type.

3. The method of claim 1, wherein the first nodes comprise Tree-SRCU information for handling requests from PREEMPT_SRCU updaters of the PREEMPT_SRCU subsystem for future PREEMPT_SRCU grace periods.

4. The method of claim 1, wherein the second nodes comprise Preemptible-RCU information for boosting a scheduling priority of blocked PREEMPT_SRCU readers, issuing stall warnings, and providing PREEMPT_SRCU grace period forward progress assistance.

5. A system, comprising:
a plurality of processors;
a computer readable storage medium;
program instructions stored on the computer readable storage medium for execution by one or more of the processors to perform operations, the operations comprising:
reducing memory requirements within a computer system, the reducing comprising:
providing an augmented sleepable read-copy update (PREEMPT_SRCU) subsystem that comprises a PREEMPT_SRCU grace period processing/callback invocation component and a PREEMPT_SRCU subsystem data structure, wherein:
the PREEMPT_SRCU grace period processing/callback invocation component manages PREEMPT_SRCU grace periods and handles PREEMPT_SRCU callbacks; and
the PREEMPT_SRCU subsystem data structure comprises a hybrid combining tree, the hybrid combining tree including non-leaf-level nodes and leaf-level nodes:
a set of first nodes storing tree-based sleepable read-copy update (Tree-SRCU) information, the set of first nodes including both non-leaf-level nodes and leaf-level nodes; and
a set of second nodes storing, at least in part, preemptible read-copy update (Preemptible-RCU) information, the set of second nodes including only leaf-level nodes; and
the PREEMPT_SRCU subsystem stores in a memory:
a set of per-processor Tree-SRCU information comprising PREEMPT_SRCU reader registration/unregistration counters to compute the end of PREEMPT_SRCU grace periods and PREEMPT_SRCU callback lists for managing PREEMPT_SRCU callbacks posted by PREEMPT_SRCU updaters;
a set of per-processor Preemptible-RCU quiescent state tracking and timing information; and
wherein the per-processor Tree_SRCU information and the per-processor Preemptible-RCU information are respectively stored in per-processor data structures as part of the PREEMPT_SRCU subsystem; and
executing, by one or more processors, the augmented sleepable read-copy update (PREEMPT_SRCU) subsystem within a computer system, the executing comprising:
advancing one or more PREEMPT_SRCU grace periods, the advancing updating references to a new copy of data while previous copies tied to old grace periods are freed when no longer referenced, where the advancing uses the set of first nodes of the hybrid combining tree storing tree-based sleepable read-copy update (Tree-SRCU) information to track processes accessing the managed data; and
handling one or more processes which have locked the data managed by PREEMPT_SRCU grace periods, where the handling responds to delayed PREEMPT_SRCU grace periods by increasing the process priority using the set of second nodes of the hybrid combining tree storing, at least in part, preemptible read-copy update (Preemptible-RCU) information.

6. The system of claim 5, wherein the first nodes and the second nodes respectively utilize data structures of either the same or different data structure type.

7. The system of claim 5, wherein the first nodes comprise Tree-SRCU information for handling requests from PREEMPT_SRCU updaters of the PREEMPT_SRCU subsystem for future PREEMPT_SRCU grace periods.

8. The system of claim 5, wherein the second nodes comprise Preemptible-RCU information for boosting a scheduling priority of blocked PREEMPT_SRCU readers, issuing stall warnings, and providing PREEMPT_SRCU grace period forward progress assistance.

9. A computer program product, comprising:
a computer readable storage medium;
program instructions stored on the computer readable storage medium for execution by a processor to perform operations, the operations comprising:
reducing memory requirements within a computer system, the reducing comprising:
providing an augmented sleepable read-copy update (PREEMPT_SRCU) subsystem that comprises a PREEMPT_SRCU grace period processing/callback invocation component and a PREEMPT_SRCU subsystem data structure, wherein:
the PREEMPT_SRCU grace period processing/callback invocation component manages PREEMPT_SRCU grace periods and handles PREEMPT_SRCU callbacks; and
the PREEMPT_SRCU subsystem data structure comprises a hybrid combining tree, the hybrid combining tree including non-leaf-level nodes and leaf-level nodes:
a set of first nodes storing tree-based sleepable read-copy update (Tree-SRCU) information, the set of first nodes including both non-leaf-level nodes and leaf-level nodes; and
a set of second nodes storing, at least in part, preemptible read-copy update (Preemptible- RCU) information, the set of second nodes including only leaf-level nodes; and the PREEMPT_SRCU subsystem stores in a memory:

a set of per-processor Tree-SRCU information comprising PREEMPT_SRCU reader registration/unregistration counters to compute the end of PREEMPT_SRCU grace periods and PREEMPT_SRCU callback lists for managing PREEMPT_SRCU callbacks posted by PREEMPT_SRCU updaters;

a set of per-processor Preemptible-RCU quiescent state tracking and timing information; and wherein the per-processor Tree SRCU information and the per-processor Preemptible-RCU information are respectively stored in per-processor data structures as part of the PREEMPT_SRCU subsystem; and executing, by one or more processors, the augmented sleepable read-copy update (PREEMPT_SRCU) subsystem within a computer system, the executing comprising:

advancing one or more PREEMPT_SRCU grace periods, the advancing updating references to a new copy of data while previous copies tied to old grace periods are freed when no longer referenced, where the advancing uses the set of first nodes of the hybrid combining tree storing tree-based sleepable read-copy update (Tree-SRCU) information to track processes accessing the managed data; and handling one or more processes which have locked the data managed by PREEMPT_SRCU grace periods, where the handling responds to delayed PREEMPT_SRCU grace periods by increasing the process priority using the set of second nodes of the hybrid combining tree storing, at least in part, preemptible read-copy update (Preemptible-RCU) information.

10. The computer program product of claim 9, wherein the first nodes and the second nodes respectively utilize data structures of either the same or different data structure type.

11. The computer program product of claim 9, wherein the first nodes comprise Tree-SRCU information for handling requests from PREEMPT_SRCU updaters of the PREEMPT_SRCU subsystem for future PREEMPT_SRCU grace periods.

12. The computer program product of claim 9, wherein the second nodes comprise Preemptible-RCU information for boosting a scheduling priority of blocked PREEMPT_SRCU readers, issuing stall warnings, and providing PREEMPT_SRCU grace period forward progress assistance.

* * * * *